United States Patent [19]

Schipper

[11] Patent Number: 5,850,197
[45] Date of Patent: Dec. 15, 1998

[54] ATTITUDE DETERMINATION USING FEWER THAN THREE ANTENNAS

[75] Inventor: John F. Schipper, Palo Alto, Calif.

[73] Assignee: Trimble Navigation, Sunnyvale, Calif.

[21] Appl. No.: 917,798

[22] Filed: Aug. 25, 1997

[51] Int. Cl.$^6$ .................................................. G01S 5/02
[52] U.S. Cl. ........................ 342/417; 342/120; 342/462
[58] Field of Search .................................... 342/120, 123, 342/463, 417

[56] References Cited

U.S. PATENT DOCUMENTS

| | | | |
|---|---|---|---|
| 5,343,402 | 8/1994 | Matsuura et al. | 364/474.03 |
| 5,347,286 | 9/1994 | Babitch | 342/359 |
| 5,452,869 | 9/1995 | Basuthakur et al. | 244/164 |
| 5,459,669 | 10/1995 | Adsit et al. | 364/459 |
| 5,506,588 | 4/1996 | Diefes et al. | 342/357 |
| 5,548,293 | 8/1996 | Cohen | 342/357 |
| 5,561,432 | 10/1996 | Knight | 342/357 |
| 5,583,508 | 12/1996 | Pugh et al. | 342/62 |
| 5,587,558 | 12/1996 | Matsushima | 178/18 |
| 5,596,203 | 1/1997 | Zingarelli et al. | 250/559.29 |
| 5,617,316 | 4/1997 | Fogler et al. | 364/424.014 |
| 5,626,315 | 5/1997 | Flament et al. | 244/168 |
| 5,628,521 | 5/1997 | Schneider et al. | 280/6.1 |
| 5,642,282 | 6/1997 | Sonehara | 364/424.046 |

OTHER PUBLICATIONS

Tom Logsdon, "The Navstar Global Positioning System," pp. 17–90, Van Nostrand Reinhold, Sep. 1992.

*Primary Examiner*—Thomas H. Tarcza
*Assistant Examiner*—Dao L. Phan
*Attorney, Agent, or Firm*—Wagner, Murabito & Hao

[57] ABSTRACT

Method and apparatus for determining the attitude or angular orientation of a moving vehicle or other moving body, using either two spaced apart antennas or a single antenna attached to or connected with the vehicle. Where two antennas are used, the spatial locations of each antenna are determined at a first selected time, and the spatial location of one antenna is determined at a second selected time. These three spatial locations determine a plane whose normal vector allows determination of the vehicle attitude at a time determined by the first and/or second selected times. Four or more spatial locations can also be used to determine a plane that indicates vehicle attitude. Where one antenna is used, for example, in a vehicle turn, the antenna spatial locations at three distinct selected times determine a plane that allows determination of the vehicle attitude at a time determined to the first, second and/or third selected times.

7 Claims, 7 Drawing Sheets

ATTITUDE DETERMINATION USING FEWER THAN THREE ANTENNAS

FIELD OF THE INVENTION

This invention relates to determination of attitude or angular orientation of a moving body using one or two antennas.

BACKGROUND OF THE INVENTION

It is generally accepted that, because three spatial locations determine a plane, three spaced apart antennas, whose locations are determinable or known, are needed to determine the attitude or angular orientation of a three-dimensional body. This is true for a motionless body, where the locations of the antennas are unchanging with time. Determination of the attitude of a motionless body is often of little immediate interest. In this instance, the body attitude can be measured by many techniques, including some that may require long time intervals to complete.

However, a moving body presents different problems, including movement from one location to another: the body is not available for extended observations and measurements. A different approach is often required, one that measures the parameters or coordinates for attitude determination in a short interval of time. Further, positioning of three spaced apart antennas on a single body may be troublesome if the body is relatively small, with a diameter as small as 10–30 cm, and accurate positioning of three spaced apart antennas relative to each other on a body can be troublesome.

Unless the attitude in one or more directions is either ignored or constrained to a predictable value, determination of attitude of a motionless or moving body has usually required use of three location-sensing or incline-sensing devices. Recent examples of use of such devices include U.S. Pat. No. 5,583,508, issued to Pugh et al, No. 5,587,558, issued to Matsushima, No. 5,596,203, issued to Zingarelli et al, No. 5,617,316, issued to Fogler et al, No. 5,626,315, issued to Flament et al, No. 5,628,521, issued to Schneider et al, and No. 5,642,282, issued to Sonehara.

What is needed here is an approach that allows use of two or fewer antennas with known locations to determine the attitude of a moving body. Preferably, the approach should allow flexibility in choice of the location of at least one of the antennas. Preferably, the method should provide an exact determination of the body attitude, within the limits of the supporting measurements, and should not require use of approximations or iterative computations to determine body attitude.

SUMMARY OF THE INVENTION

These needs are met by the invention, which provides a method and associated apparatus for quickly and accurately determining the attitude or angular orientation of a moving body, such as a land vehicle, a waterborne vehicle or an airborne vehicle, using measurements made by fewer than three antennas to determine the locations the antennas or locations of surrogate points on the body. In a first embodiment that uses two antennas, measurements of locations L1(t) and L2(t) of the respective first and second antennas are made at a first time t=t1 and at a second, different time t=t2, thus producing four antenna locations Li(tj) (i=1, 2; j=1, 2). A selected one of these four antenna locations can be deleted, if desired. The two antenna locations relative to each other and to the body are assumed known or determinable. The time difference magnitude $\Delta t12=|t2-t1|$ is positive and preferably small, of the order of one second to tens of seconds, and may depend upon the magnitude of the moving body velocity and/or upon the separation distance between the two antennas relative to the body.

In a first approach, it is assumed that the body's attitude does not change appreciably between the first and second times. A selected three of the four antenna locations Li(tj) are use to determine a plane that passes through those three locations. A normal to this plane determines the attitude of the body, if the spatial relationships of the two antenna locations relative to each other and to the body are known.

If all four of the antenna locations are to be used, this will produce $$\binom{4}{3}$$

=4 distinct combinations of three locations, with each combination determining a plane and being determined in part by a normal vector Nij (i=1,2; j=1,2) to that plane. These four normal vectors Nij may be weighted according to a selected weighting scheme and averaged to determine a representative normal vector N12(rep) for the body at a time, such as t=t1 or t=t2 or t=(t1+t2)/2. Alternatively, the representative normal vector N12(rep) may be determined algebraically, using an optimization technique.

In a second embodiment, which uses one antenna, the body's attitude is allowed to change moderately with the passage of time, and locations L1(tj)(j =1,2,3) of the first antenna at three or more distinct times t=t1, t =t2 and t=t3 are determined, with t1<t2<t3. A first vector V21 connecting the locations L1(t2) and L1(t1) and a second vector V23 connecting the locations L1(t2) and L1(t3) are determined, and a plane Π(1,2,3) is determined that includes (and is spanned by) the vectors V21 and V23. A normal vector N123 to the plane Π(1,2,3) is determined, and the angular orientation of the vector N123 determines the attitude of the moving body.

In a third embodiment, which uses two antennas, the body's attitude is allowed to change moderately with the passage of time, and locations Li(tj) (i =1,2; j=1,2,3) of each of the first and second antennas at three or more distinct times t=t1, t=t2 and t=t3 are determined, with t1<t2<t3. A first representative normal vector N12(rep) is determined using at least three of the four locations L1(t1), L2(t1), L1(t2) and L2(t2), as in the first embodiment. A second representative normal vector N23(rep) is determined using at least three of the four locations L1(t2), L2(t2), L1(t3) and L2(t3), as in the first embodiment. A representative normal vector N123(rep) at or near the time t=t2 is determined, using a suitable average of the normal vectors N12(rep) and N23(rep) and at least one of the times t1, t2 and t3 or differences thereof. The representative normal vector N123 (rep) is used to determine the attitude of the moving body at or around the time t=t2.

DESCRIPTION OF BEST MODES OF THE INVENTION

Figure 1:
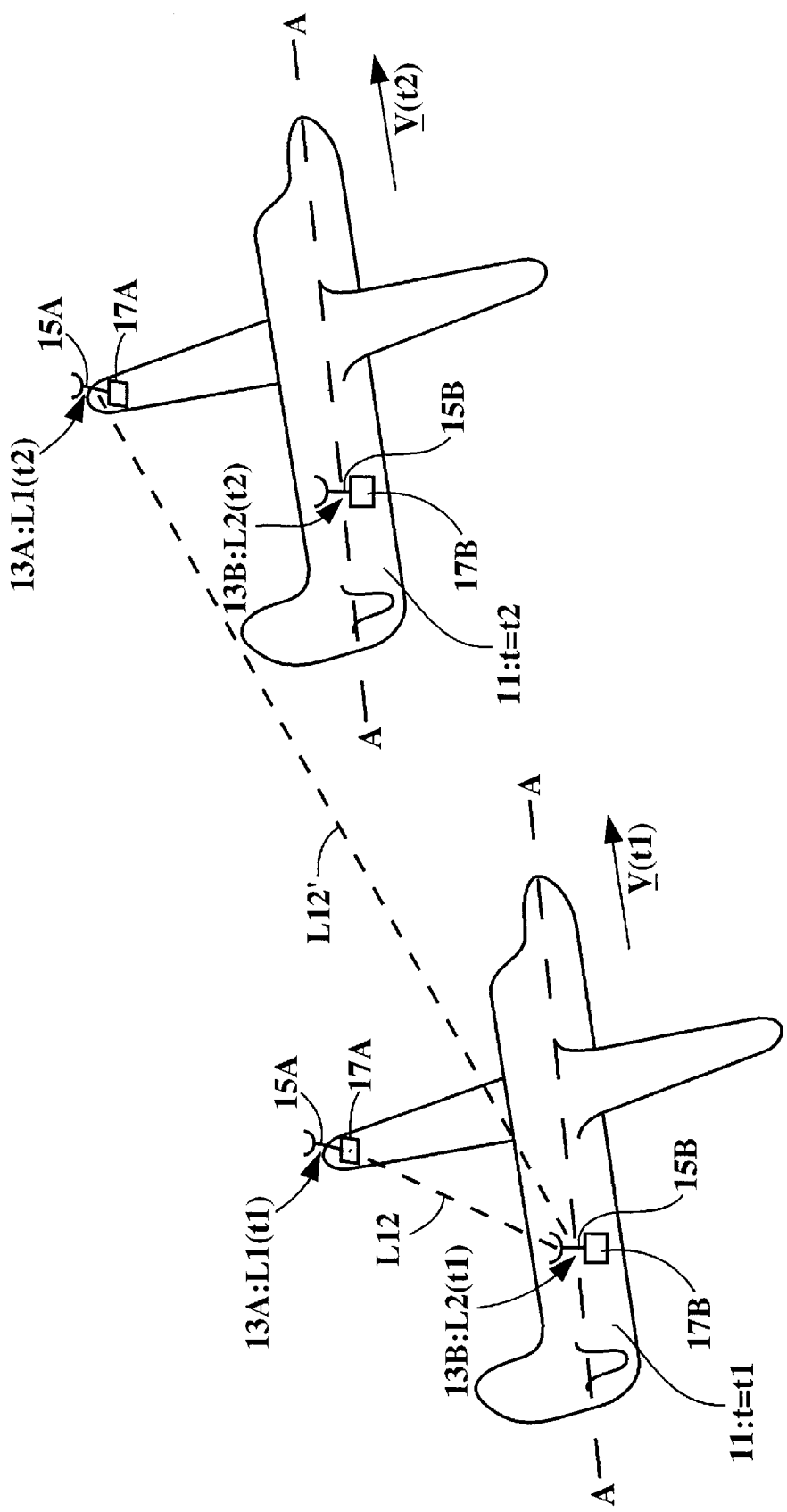
FIG. 1 illustrates use of the invention in a representative situation.

In FIG. 1, which illustrates application of the invention, an airborne (or marine or land) vehicle 11 moves along a path at an unknown attitude or angular orientation. The vehicle 11 has a first location determination (LD) unit 13A, including a first LD signal antenna 15A and a first LD signal receiver 17A located at a first location L1(t), such as on an aircraft wing, which is fixed on and known relative to the vehicle. The vehicle 11 also has a second LD unit 13B, including a second LD signal antenna 15B and a second LD signal receiver 17B (which may coincide with the receiver 17A) located at a second location L2(t) on the vehicle. At least one of the two locations 19A and 19B is not located near a central axis AA of the vehicle 11, and an instantaneous velocity vector v(t) for the vehicle may pass through or near one, but not both, of these locations. The second LD unit 13B may be handheld but is preferably located at a fixed location on the vehicle 11. The first and second LD units 13A and 13B receive LD signals from three or more LD signal sources 21, 23, 25 and 27, which may be ground-based but are preferably satellite-based, and the received LD signals are preferably processed in a single receiver/processor, such as 17A or 17B.

The locations L1(t) and L2(t) of the first and second LD antennas 15A and 15B may be determined approximately or exactly, as discussed in the following. The absolute spatial locations L1(t) and L2(t) of the LD signal antennas 15A and 15B are determined at a first time t=t1 and at a second, different time t=t2 ($\neq$t1), where the magnitude of the time difference, $\Delta t21 = |t2-t1|$, lies in a range from a few seconds to a few minutes (preferably shorter). Either three or four of the LD signal antenna locations L1 (t=t1), L2(t=t1), L1(t=t2) and L2(t=t2) are used here, but only two LD signal antennas, 15A and 15B, are required. Assume, for the sake of the development, that the three noncollinear locations L1(t=t1), L2(t=t1) and L1(t=t2) are to be used here.

The two locations L1(t=t1) and L2(t=t1) defined a line L12 therebetween, and a first infinite continuum of planes exists, all of which pass through the line L12(t1). The two locations L2(t=t1) and L1(t=t2) define a line L12' therebetween, and a second infinite continuum of planes exists, all of which pass through the line L12'. Because the locations L1(t=t1) and L1(t=t2) are distinct and spaced apart, the lines L12 and L12' are not coincident, and these two lines together determine a plane $\Pi(1,2)$ that contains both the lines L12 and L12'. The locations L1(t=t1), L2(t=t1) and L1(t=t2) do not have the same value of at least one location coordinate, for example, the x-coordinate, in a three-dimensional Cartesian coordinate representation (x,y,z). The line L12 has a representation $$y-y2(t1)=(y1(t1)-y2(t1))(x-x2(t1))/(x1(t1)-x2(t1)) = k1(x-x2(t1)), \quad (1)$$

$$z-z2(t1)=(z1(t1)-z2(t1))(x-x2(t1))/(x1(t1)-x2(t1)) = k2(x-x2(t1)), \quad (2)$$

and the line L12' has a representation $$y-y2(t1)=(y1(t2)-y2(t1))(x-x2(t1))/(x1(t2)-x2(t1)) = k1'(x-x2(t1)), \quad (3)$$

$$z-z2(t1)=(z1(t2)-z2(t1))(x-x2(t1))/(x1(t2)-x2(t1)) = k2'(x-x2(t1)), \quad (4)$$

where (x1 (t1),y1 (t1),z1 (t1)), (x2(t1),y2(t1),z2(t1)) and (x1 (t2),y1(t2),z1(t2)) are the spatial coordinates of the three respective locations L1(t=t1), L2(t=t1) and L1(t=t2). Because these three locations are non-collinear, the constraint $$k1k2'-k2k1' \neq 0 \quad (5)$$

is satisfied here. A plane $\Pi(1,2)$ that passes through these three known spatial locations is representable in the form $$A(x-x2(t1))+B(y-y2(t1))+C(z-z2(t1))=0, \quad (6)$$

$$B=(k2-k2')A/(k1k2'-k2\ k1'), \quad (7)$$

$$C=(k1'-k1)A/(k1k2'-k2\ k1'), \quad (8)$$

where A is an arbitrary non-zero value.

The plane $\Pi(1,2)$ has a well-defined vector normal N12, whose vector coordinates may be determined as $$N12=(A/R,\ B/R,\ C/R) \quad (9)$$

$$R=\{A^2+B^2+C^2\}^{1/2}. \quad (10)$$

The normal vector N12 and the known locations L1(t) and L2(t) of the two antennas relative to the vehicle 11 are used to determine the attitude of the vehicle 11 at a time t=$\tau$12 determined by t1 and t2, if this attitude does not change appreciably from the time t=t1 to the time t=t2. Normally, the time value $\tau$12 will lie in the range t1$\leq\tau$12$\leq$t2 (assuming that t1<t2). The time value t12 can, for example, be chosen to be any of the following values: $\tau$12=t1, $\tau$12=t2, $\tau$12=(t1+t2)/2, $\tau$12=2·t1/3+t2/3 (time centroid associated with the triangle of the three spatial locations).

All four of the locations L1(t=t1), L2(t=t1), L1(t=t2) and L2(t=t2) can be used in a second embodiment, if desired, in order to develop $$\binom{4}{3}$$

Figure 2A:
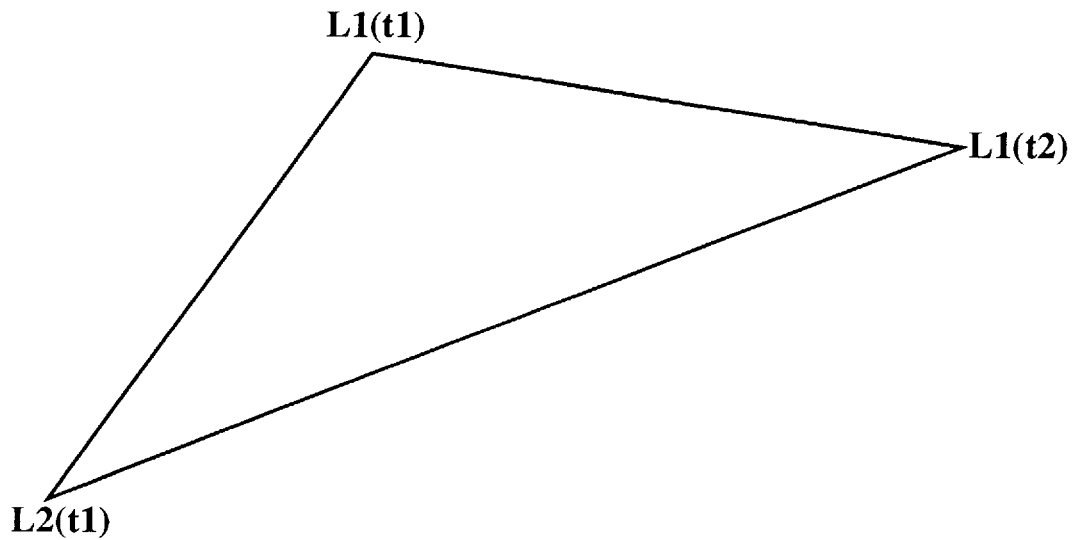
FIGS. 2A–2E illustrate uses of the invention where more than three antenna locations are available.
Figure 2B:
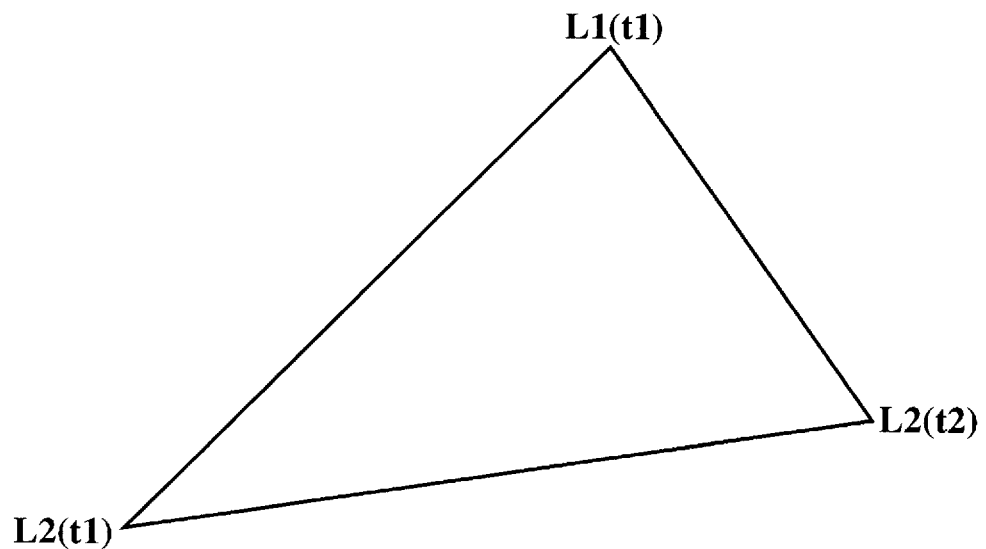
Figure 2C:
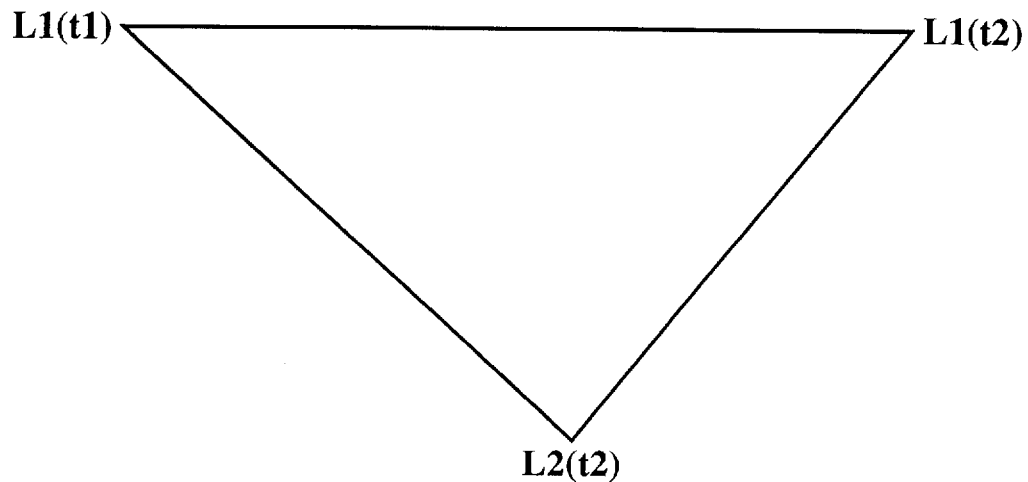
Figure 2D:
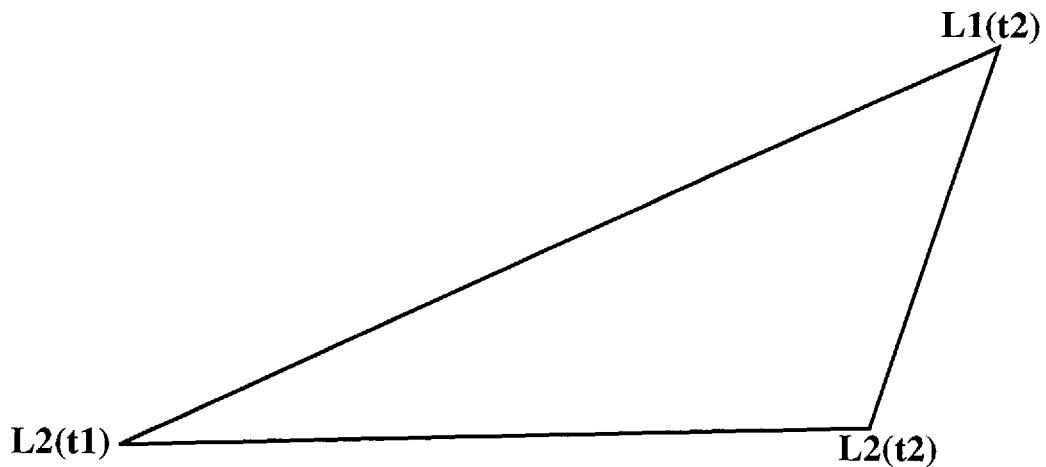
Figure 2E:
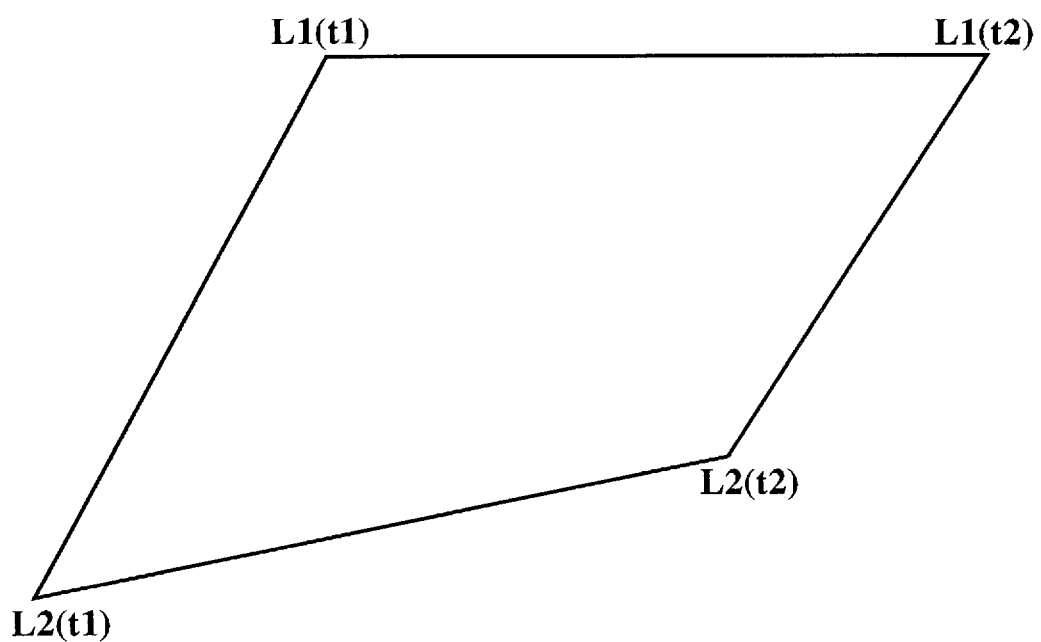

=4 vehicle attitude planes and to compare the angular orientations of these four planes with each other for a consistency check. It is possible, but unlikely, that the normal vectors for these four planes will coincide, although the corresponding vector coordinates should be close to each other, apart from a common sign difference. These different normal vectors, denoted N12, N12', N12" and N12'" for convenience, may be reconciled in any of several approaches. The four normal vectors N12, N12', N12" and N12'" are respectively defined by the following locations, as illustrated in FIGS. 2A, 2B, 2C and 2D. FIG. 2E is a projection of all four spatial locations on a selected plane, to indicate the spatial relationship of the four locations.

N12: L1(t1), L2(t1), L1(t2)

N12': L1(t1), L2(t1), L2(t2)

N12": L1(t1), L1(t2), L2(t2)

N12'": L2(t1), L1(t2), L2(t2)

In a first approach, a new representative normal vector N12(avg) (not necessarily having unit length) is formed from a weighted arithmetic average N12(avg)=w N12+w' N12'+w" N12"+(1-w'-w"-w'") N12'", (11) where the weights w, w' and w'" are three selected real numbers, not necessarily lying in the real number interval [0,1], and the weights are determined according to physical or statistical considerations. For example, if the coordinates of the different normal vectors N12, N12', N12" and N12'" have different standard deviations $\sigma$12, $\sigma$12', $\sigma$12" and $\sigma$12'" associated with them from the measurements made for the coordinates associated with the four spatial locations L1(t=t1), L2(t=t1), L1(t=t2) and L2(t=t2), the weights w, w', w" and (1-w'-w"-w'") could be selected to decrease as the respective standard deviations $\sigma$12, $\sigma$12', $\sigma$12" and $\sigma$12'" increase.

In a second approach, where the coordinates of all four spatial locations are to be used to determine a representative unit vector normal N12(rep) for a plane to be used to determine attitude of the vehicle 11, renumber the four locations or points as i=1, 2, 3 and 4, with location coordinates $(x_p, y_p, z_p)$ (p =1, 2, 3, 4), for numerical convenience here. A plane in three-dimensional space containing a line connecting the points $(x_p, y_p, z_p)$ and $(x_q, y_q, z_q)$ (p=1,2,3,4; q=1,2,3,4; p≠q) will be representable as $$A(x-x_k)+B(y-y_k)+C(z-z_k)=0, \quad (12)$$

where $(x_k, y_k, z_k)$ is either $(x_p, y_p, z_p)$ or $(x_q, y_q, z_q)$ and the coefficients A, B and C are unknown as yet. A condition subsidiary to Eq. (12) is $$A(x_p-x_q)+B(y_p-y_q)+C(z_p-z_q)=0, \quad (13)$$

and Eq. (13) has $$\binom{4}{2}$$

=6 distinct forms, which depend upon the integer values of the indices p and q (p<q; p=1,2,3; q=2,3,4). The desired unit vector normal N12(rep) will satisfy Eqs. (9) and (10) so that Eqs. (13) and (10) can be expressed in matrix form as $$\Delta R\ D=0, \quad (14)$$

$$D^{tr}\ D=1, \quad (15)$$

where $\Delta R$ is a 6-row by 3-column matrix having the row entries $x_p-x_q$, $y_p-y_q$, and $z_p-z_q$ in the six rows and D is a 3×1 column matrix with entries A, B and C. The two relations (14) and (15) may not be simultaneously satisfiable, and the problem is recast as determining coefficients A, B and C in the matrix D that minimize the error $$\epsilon = D^{tr}\Delta R^{tr} \Delta R\ D + \lambda D^{tr} D, \quad (16)$$

where $\lambda$ is an undetermined multiplier, included to assure satisfaction of the unit length constraint in Eq. (15). The error $\epsilon$ in Eq. (16) is minimized by requiring that D and $\epsilon$ satisfy the matrix relations (15) and $$\Delta R^{tr}\Delta R\ D + \lambda D = 0. \quad (17)$$

The coefficients A, B and C of the unit vector normal N12(rep) can be found using this formalism, and the attitude of the vehicle 11 can be found using the vector N12(rep).

A third approach, which is formally similar to the second approach, begins with a plane P defined by $$a \cdot x + b \cdot y + c \cdot z + d = 0 \quad (18)$$

and seeks values of the parameters a, b, c and d that minimize, in some sense, the "distances" of this plane from each of the four locations with location coordinates $(x_p, y_p, z_p)$ (p=1, 2, 3, 4), subject to a unit length constraint such as $$a^2+b^2+c^2=1. \quad (19)$$

In this formulation, the parameters a, b and c are interpretable as direction cosines, and the parameter d is interpretable as the length of a perpendicular footer drawn from the origin to the plane P. This formulation depends upon how the "distances" are defined. One approach here introduces an error $\epsilon_s$ (s a selected positive number), defined by $$\epsilon_s = \sum_{p=1}^{4} \{a \cdot x_p + b \cdot y_p + c \cdot z_p + d\}^s, \quad (20)$$

where the unit length constraint in Eq. (19) is imposed. The choice s=2 may be made in Eq. (20) to reduce the computational complexity.

The preceding development assumes that the attitude of the vehicle 11 does not change appreciably between a first time t=t1 and a second time t=t2. In a third embodiment, this assumption is relaxed, and the vehicle attitude is allowed to change appreciably within a time interval t1≦t≦t3. Locations of the LD signal antennas 15A and 15B are also determined at three selected times, with t1<t2<t3. and the corresponding spatial locations Li(t=tj), with corresponding location coordinates (xi(tj),yi(tj),zi(tj)) for i=1, 2 and j=1, 2, 3. A first unit normal vector N12 is determined using three or all four of the locations L1(t=t1), L2(t=t1), L1(t=t2) and L2(t=t2). A second unit normal vector N23 is determined using three or all four of the locations L1(t=t2), L2(t=t2), L1(t=t3) and L2(t=t3). In a first approach, a representative normal vector N(rep), for a plane that indicates vehicle attitude at or around the time t=t2, is defined to be $$N(\text{rep})=f(t1;t2;t3)N12+(1-f(t1;t2;t3))N23, \quad (21)$$

where the function f satisfies 0≦f≦1 and satisfies the following requirements: (1) f tends toward 1 as the time t1 approaches the time t2, with t3 fixed and distinct from t2; and (2) f tends toward 0 as the time t3 approaches the time t2, with t1 fixed and distinct from t2. One example of a function f(t1;t2;t3) that satisfies these requirements is $$f(t1;t2;t3)=\{1\cdot(t3-t2)+0\cdot(t2-t1)\}/(t3-t1). \quad (22)$$

Other suitable examples for the function f are easily found. Each of the vectors N12 and N23 can be determined using the first approach (three locations used) or the second approach (all four vectors used) for the first embodiment.

Optionally, a third unit normal vector N(rep) is determined using three or all four of the locations L1(t=t1), L2(t=t1), L1(t=t3) and L2(t=t3). In a second approach, which extends the first approach, a third unit normal vector N13 is determined using at least three of the four locations L1(t=t1), L2(t=t1), L1(t=t3) and L2(t=t3). A representative normal vector N(rep), for a plane that indicates vehicle attitude at a time around the time t=t2, is defined to be $$N(\text{rep})=f1(t1;t2;t3)N12+f2(t1;t2;t3)N13+(1-f1\ (t1;t2;t3)-f2(t1;t2;t3))N23, \quad (23)$$

where f1(t1;t2;t3) and f2(t1;t2;t3) are functions satisfying the following requirements: (1) 0≦f1(t1;t2;t3)≦1; (2) 0≦f2 (t1;t2;t3) ≦1; (3) 0≦f1(t1;t2;t3)+f2(t1;t2;t3)≦1; (4) f1+f2 tends toward 1 as the time t1 approaches the time t2, with t3 fixed and distinct from t1 and t2; (5) f1+f2 tends toward 0 as the time t3 approaches the time t2, with t1 fixed and distinct from t2 and t3. The functions f1 and f2 can be defined by analogy to the function f used in Eq. (18).

If the vehicle 11 is executing a turn, the vehicle attitude may be approximately constant as the turn is executed. In this instance, use of a single LD signal antenna may suffice for attitude determination. The spatial location L1(t) of the antenna 15A is determined at first, second and third selected times t=t1, t=t2 and t=t3 with t1<t2<t3. A first line L21 connecting the locations L1(t=t2) and L1(t=t2) has a representation $$y-y1(t2)=(y1(t1)-y1(t2))(x-x1(t2))/(x1(t1)-x1(t2))=k3(x-x1(t2)), \quad (24)$$

$$z-z1(t2)=(z1(t1)-z1(t2))(x-x1(t2))/(x1(t1)-x1(t2))=k4(x-x1(t2)), \quad (25)$$

by analogy with Eqs. (1) and (2). A second line L23 connecting the locations L1(t=t2) and L1(t=t3) has a representation $$y-y1(t2)=(y1(t3)-y1(t2))(x-x1(t2))/(x1(t3)-x1(t2))=k5(x-x1(t2)), \quad (26)$$

$$z-z1(t2)=(z1(t3)-z1(t2))(x-x1(t2))/(x1(t3)-x1(t2))=k6(x-x1(t2)). \quad (27)$$

The three locations L1(t=t1), L1(t=t2) and L1(t=t3) are non-collinear so that the constraint $$k3\ k6'-k4\ k5\neq 0 \quad (28)$$

is satisfied here. A plane Π(1,2,3) that passes through these three known spatial locations is representable in the form $$A'(x-x1(t2))+B'(y-y1(t2))+C'(z-z1(t2))=0, \quad (29)$$

$$B'=(k4-k6)A'/(k3k6-k4k5), \quad (30)$$

$$C'=(k5-k3)A'/(k3k6-k4k5), \quad (31)$$

where A' is an arbitrary non-zero value, by analogy with development of the Eqs. (6), (7) and (8). A normal vector for the plane Π(1,2,3) is then used to determine the attitude of the vehicle at a time that is determined with reference to the time t=t2. This vehicle attitude determination can be used, for example, if the vehicle executes a banked turn or flat (planar) turn with a substantially constant radius of curvature.

Figure 3:
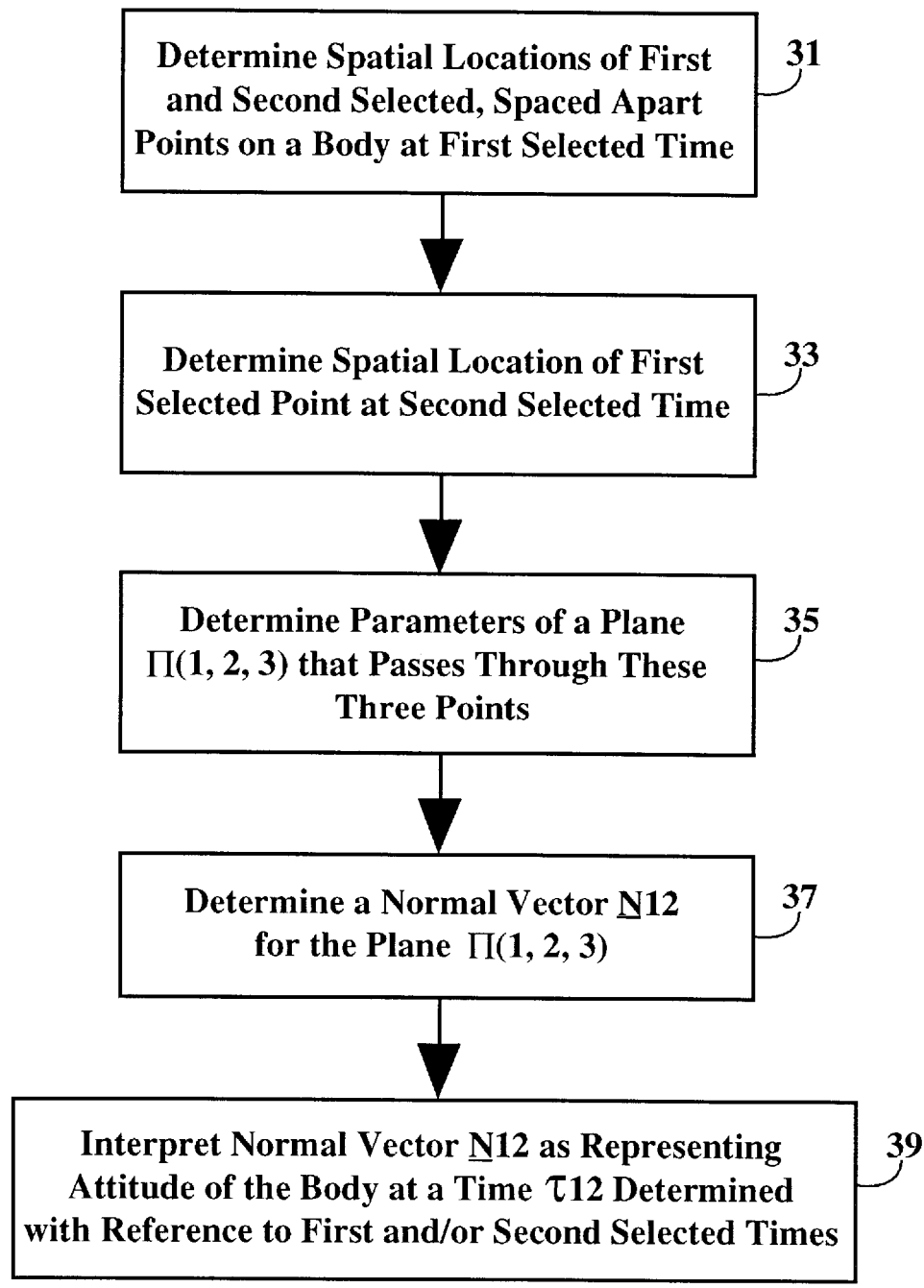
FIGS. 3, 4 and 5 are flow charts illustrating suitable procedures for practicing the invention.

FIG. 3 is a flow chart illustrating a suitable procedure for practicing the invention. In step 31, the spatial locations of a first selected point and at a second selected point on or adjacent to the body are determined at a first selected time, where the first and second selected points are spaced apart. In step 33, the spatial location of the first selected point is determined at a second selected time, where the second selected time can be either greater than or less than the first selected time. In step 35, parameters describing a plane Π(1,2,3) are determined, where the plane passes through the first selected point at the first selected time, through the second selected point at the first selected time, and through the first selected point at the second selected time. In step 37, a normal vector N12 is determined for the plane determined in step 35. In step 39, the normal vector is interpreted as representing an attitude or angular orientation of the body at a time t=τ12 that is determined with reference to the first and second selected times.

Figure 4:
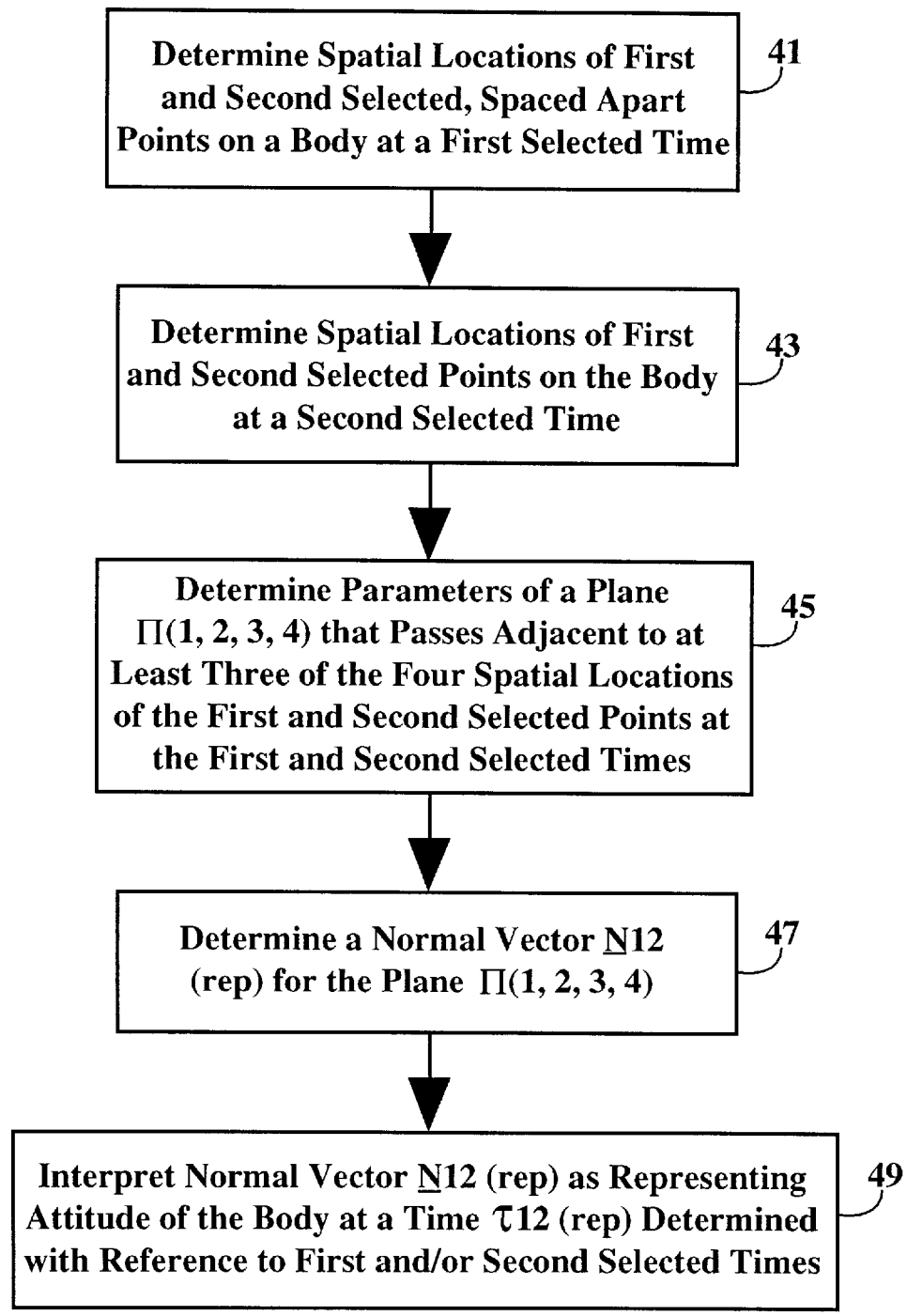

FIG. 4 is a flow chart illustrating another suitable procedure for practicing the invention. In step 41, the spatial locations of a first selected point and at a second selected point on or adjacent to the body are determined at a first selected time, where the first and second selected points are spaced apart. In step 43, the spatial location of the first and second selected points are determined at a second selected time, where the second selected time can be either greater than or less than the first selected time. In step 35, parameters describing a plane Π(1,2,3,4) are determined, where the plane passes adjacent to at least three of the four spatial locations of the first and second selected points at the first and second selected times. Step 35 is carried out using, for example, the first, second or third approach set forth in the preceding development of Eqs. (11)–(20). In step 47, a normal vector is determined for the plane Π(1,2,3,4) determined in step 45. In step 49, the normal vector is interpreted as representing an attitude or angular orientation of the body at a time t=τ12 that is determined with reference to the first and second selected times.

Figure 5:
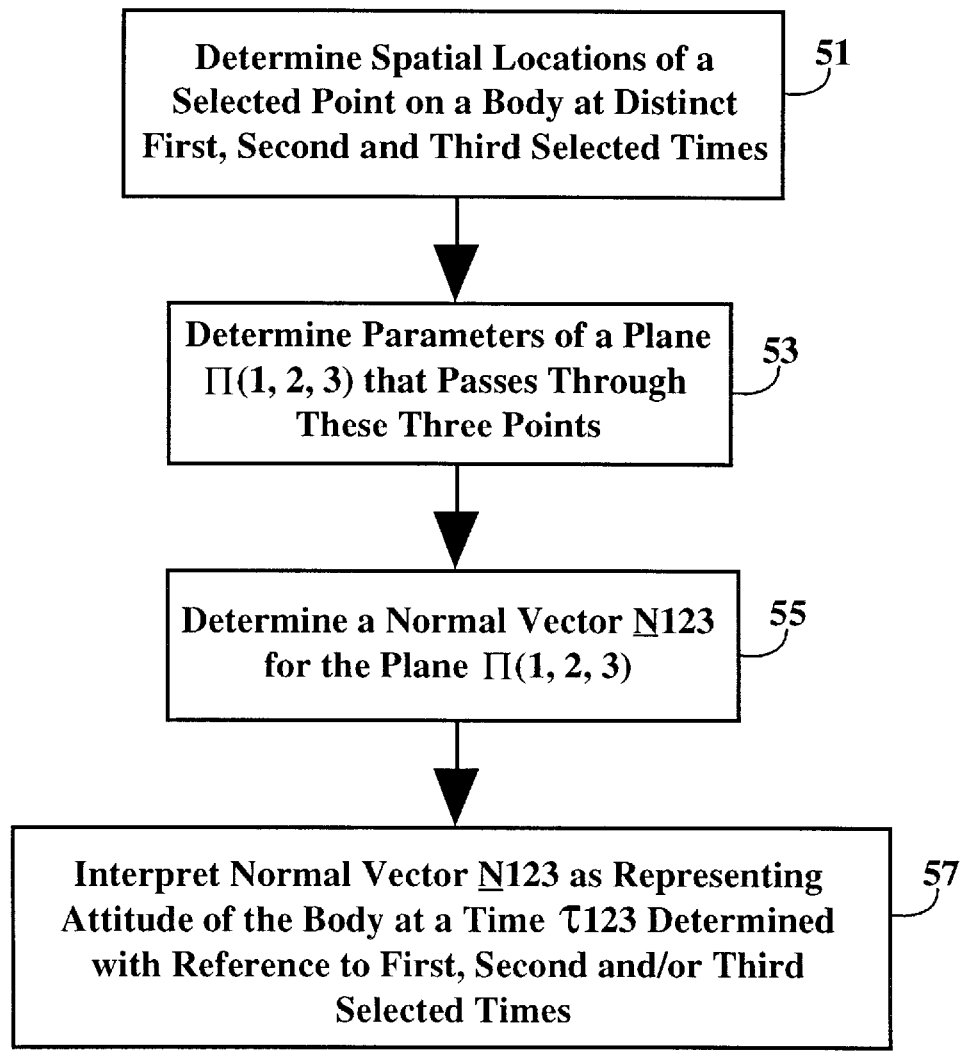

FIG. 5 is a flow chart illustrating another suitable procedure for practicing the invention. In step 51, the three spatial locations of a selected point on or adjacent to the body are determined at first, second and third distinct selected times. The three spatial locations are assumed here to be noncollinear. In step 53, parameters describing a plane Π'(1,2,3) are determined, where the plane passes through each of the three selected points. In step 55, a normal vector N123 is determined for the plane Π'(1,2,3) determined in step 53. In step 57, the normal vector is interpreted as representing an attitude or angular orientation of the body at a time t=τ123 that is determined with reference to the first, second and third selected times.

The location determination (LD) unit 13A and 13B used to determine the spatial locations of the selected point or points on the body are preferably part of a satellite-based location determination system, such as the Global Positioning System (GPS), the Global Orbiting Navigational Satellite System (GLONASS) or a Low Earth Orbit (LEO) system such as the 66-satellite Iridium system being developed by Motorola. The LD signals received by each LD signal antenna 15A and 15B can be analyzed by a separate LD signal receiver/processor 17A and 17B. Alternatively, LD signals received by the two LD antennas 17A and 17B can be analyzed by a single LD signal receiver/processor that is connected to each of the antennas. A GPS location determination system is discussed by Tom Logsdon, *The Navstar Global Positioning System*, Van Nostrand Reinhold, 1992, pp. 17–90.

I claim:

1. A method for determining the attitude of a moving body, the method comprising the steps of:

determining the spatial location of a first selected point on or adjacent to the body at a first selected time and at a second selected time that is distinct from the first selected time;

determining the spatial location of a second selected point, spaced apart from the first selected point, on or adjacent to the body at about the first selected time;

determining a primary normal vector to a plane that passes through the first selected point spatial locations at the first and second selected times and through the second selected point spatial location at the first selected time; and interpreting the primary normal vector as representing an angular orientation of the moving body at a third selected time that is determined with reference to at least one of the first selected time and the second selected time.

2. The method of claim 1, further comprising the step of selecting said third time from a class of times consisting of the first selected time, the second selected time, and an average of the first and second selected times.

3. The method of claim 1, further comprising the steps of:

determining the spatial location of said second selected point on said body at about said second selected time;

determining a normal vector to at least one of first, second and third supplemental planes, where:

the first supplemental plane passes through the second selected point at the second selected time, through the first selected point at the first selected time and through the first selected point at the second selected time;

the second supplemental plane passes through the second selected point at the second selected time, through the first selected point at the first selected time and through the second selected point at the first selected time; and the third supplemental plane passes through the second selected point at the second selected time, through the first selected point at the second selected time and through the second selected point at the first selected time;

determining a representative normal vector as a weighted average of said primary normal vector and the at least one supplemental plane; and interpreting the representative normal vector as representing an angular orientation of said moving body at a fourth selected time that is determined by at least one of the first selected time and the second selected time.

4. The method of claim 1, further comprising the steps of:

determining the spatial location of said first selected point at a third selected time that is distinct from said first and second selected times;

determining the spatial location of said second selected point at a fourth selected time that is determined with reference to at least one of said second selected time and the third selected time;

determining a second primary normal vector to a second plane that passes through the first selected point spatial locations at the second and third selected times and through the second selected point spatial location at the fourth selected time;

determining a third primary normal vector that is a weighted average of the first primary normal vector and the second primary normal vector; and interpreting the third primary normal vector as representing an angular orientation of the moving body at a fifth selected time that is determined with at least one of said first selected time, said second selected time and the third selected time.

5. The method of claim 1, further comprising the steps of:

determining the spatial location of said first selected point at a third selected time that is distinct from said first and second selected times;

determining the spatial location of said second selected point at a fourth selected time that is determined with reference to at least one of said second selected time and the third selected time;

determining a second primary normal vector to a second plane that passes through the first selected point spatial locations at the second and third selected times and through the second selected point spatial location at the fourth selected time;

determining a third primary normal vector that is a sum of the first primary normal vector and the second primary normal vector, with selected coefficients for the sum; and interpreting the third primary normal vector as representing an angular orientation of the moving body at a fifth selected time that is determined with at least one of said first selected time, said second selected time and the third selected time.

6. The method of claim 1, further comprising the steps of:

determining the spatial location of said first selected point at a third selected time that is distinct from said first and second selected times;

determining the spatial location of said second selected point at a fourth selected time that is determined with reference to at least one of said second selected time and the third selected time;

determining a second primary normal vector to a second plane that passes through the first selected point spatial locations at the second and third selected times and through the second selected point spatial location at the fourth selected time;

determining a third primary normal vector to a third plane that passes through the first selected point spatial locations at the second and third selected times and through the third selected point spatial location at a fifth selected time that is determined with reference to at least one of said first selected time and the third selected time;

determining a fourth primary normal vector that is a weighted average of said first primary normal vector, the second primary normal vector and the third primary normal vector; and interpreting the fourth primary normal vector as representing an angular orientation of the moving body at a sixth selected time that is determined with at least one of said first selected time, said second selected time and the third selected time.

7. A method for determining the attitude of a moving body, the method comprising the steps of:

determining the spatial location of a selected body point on or adjacent to the body at a first selected time, at a second selected time and at a third selected time, where the three selected times are distinct from each other;

determining a primary normal vector to a plane that passes through the spatial locations of the selected body point at the first, second and third selected times; and interpreting the primary normal vector as representing an angular orientation of the moving body at a fourth selected time that is determined with reference to the at least one of the first, second and third selected times.

* * * * *